United States Patent [19]

Sugimoto et al.

[11] Patent Number: 4,650,636
[45] Date of Patent: Mar. 17, 1987

[54] METHOD OF ESTIMATING WATER LEAKAGE POSITION

[75] Inventors: Hiroshi Sugimoto, Toyonaka; Toshio Takenaka, Kobe, both of Japan

[73] Assignee: Mitsubishi Denki Kabushiki Kaisha, Tokyo, Japan

[21] Appl. No.: 586,744

[22] Filed: Mar. 6, 1984

[30] Foreign Application Priority Data

Aug. 12, 1983 [JP] Japan .................. 58-148562

[51] Int. Cl.⁴ .................. G21C 17/00; G01M 3/00
[52] U.S. Cl. .................. 376/250; 73/40; 73/40.5 R
[58] Field of Search .............. 376/250, 313; 73/40 R, 73/40.5

[56] References Cited

U.S. PATENT DOCUMENTS

| | | | |
|---|---|---|---|
| 3,098,023 | 7/1963 | Schluderberg | 376/250 |
| 3,258,403 | 6/1966 | Malay | 376/250 |
| 3,644,172 | 2/1972 | Campbell | 376/250 |
| 3,699,802 | 10/1972 | Hotta et al. | 73/40.5 R |
| 3,712,850 | 1/1973 | Campbell et al. | 376/250 |
| 3,975,943 | 8/1976 | Brachet | 73/40.5 R |
| 3,987,662 | 10/1976 | Hara et al. | 73/40.5 R |
| 4,081,323 | 2/1978 | Gans, Jr. et al. | 376/250 |
| 4,243,485 | 1/1981 | Chabin | 376/313 |
| 4,395,381 | 6/1983 | Costes | 376/313 |

FOREIGN PATENT DOCUMENTS

| | | | |
|---|---|---|---|
| 2517387 | 10/1976 | Fed. Rep. of Germany | 376/250 |
| 2606527 | 9/1977 | Fed. Rep. of Germany | 376/250 |
| 54-159588 | 12/1979 | Japan | 376/250 |
| 90138 | 5/1983 | Japan . | |
| 100728 | 6/1983 | Japan . | |
| 59-162434 | 9/1984 | Japan | 73/40 |

*Primary Examiner*—Salvatore Cangialosi
*Attorney, Agent, or Firm*—Oblon, Fisher, Spivak, McClelland & Maier

[57] ABSTRACT

A method of estimating water leakage position is estimated in such a manner that at least two leakage water collection ports are provided at the bottom part of a containment vessel, that a leakage water sensor is provided at each of said leakage water collection ports, and that a position within a horizontal plane of the position where the water leakage has occurred in said containment vessel is estimated with a signal from the leakage water sensor and the positions where said leakage water collecting ports are provided.

3 Claims, 3 Drawing Figures

METHOD OF ESTIMATING WATER LEAKAGE POSITION

BACKGROUND OF THE INVENTION

1. Field of the Invention

This invention relates to an improvement in the method of finding water leakage positions within a containment vessel for a nuclear reactor, for example, with a device for monitoring the operating conditions of the nuclear reactor.

2. Description of the Prior Art

The containment vessel for the nuclear reactor has in its interior the so-called "primary coolant pipe arrangement" extended in all directions. The total length of extension of the pipe arrangement becomes considerably long and moreover the coolant flowing inside the tube is at a high temperature and high pressure, on account of which there is high probability of water leaking from joints and seams of the pipes. Such water leakage should be discovered as early as possible by constant inspection, and, if found, be repaired while the quantity of leakage is still small.

However, the interior of the containment vessel is generally at a high radiation level, which makes it difficult for inspecting personnel to come in and out of the containment vessel freely. In order to avoid such a risky situation, there have been contemplated various unmanned or remote inspection methods.

FIG. 1 of the accompanying drawing illustrates one example of a conventional remote inspection method, in which a numeral 1 refers to a pipe arrangement which is to be inspected, a reference numeral 2 designates a valve to be inspected, 3 denotes a handle of the valve, 4 a connection between the pipe arrangement and the valve, 5 a television camera for industrial use (hereinafter abbreviated as "ITV"), and 6 refers to illuminating lamps, all being installed in the containment vessel (not shown in the drawing).

With the remote inspection system of the above-mentioned construction, the inspecting personnel (not shown in the drawing) is able to watch the pipe arrangement 1, the valve 2, and so forth from the exterior of the containment vessel by use of a television image pick-up device (not shown in the drawing) connected with the ITV 5, and he is also able to adjust direction, brightness, and other factors of the ITV 5 for the purpose of inspection by means of a remote control device (not shown in the drawing).

While the conventional method of inspecting the water leakage within the containment vessel has been done as mentioned above, such inspection of the water leaking points of the pipe within the containment vessel of a large volume takes very many hours and moreover it is considerably difficult, for the reasons that such possible leaking points of the water leakage are as many as a few hundreds or more, that since the pipes are arranged in a three-dimensional network structure, the water leakage points of the pipe is likely to be hidden behind other installations, and that the sight of the ITV is narrow, and others.

SUMMARY OF THE INVENTION

The present invention has been made with a view to eliminating the disadvantages inherent in the conventional water leakage inspection system as described in the foregoing, and is directed to provide a method of easily locating positions of the water leakage in the pipe network by first limiting an estimated range of occurrence of the water leakage to a particular extent within a horizontal plane in accordance with a dropping position of the leakage water which is falling on the bottom-most part of the containment vessel.

According to the present invention, in general aspect of it, there is provided, a method of estimating water leakage position in which at least two leakage water collecting ports are provided at the bottom part of a containment vessel, a leakage water sensor is provided at each of said leakage water collecting ports, and a position within a horizontal plane of the position where the water leakage has occurred in said containment vessel is estimated with a signal from the leakage water sensor and the positions where said leakage water collecting ports are provided.

The foregoing object, other objects as well as specific construction and principle of the method for estimating the water leakage position according to the present invention will become more apparent and understandable from the following detailed description thereof, when read in connection with the accompanying drawing.

DETAILED DESCRIPTION OF A PREFERRED EMBODIMENTS

In the following, the present invention will be described in detail with reference to a preferred embodiment thereof shown in the accompanying drawing.

Figure 2:
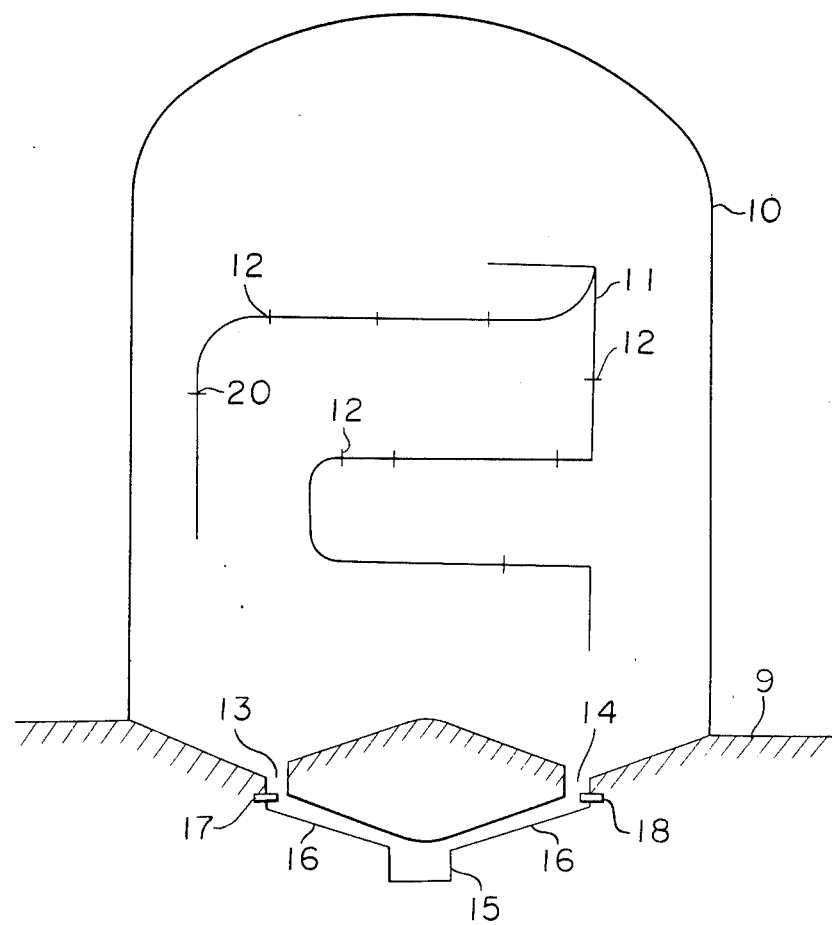
FIG. 2 is a schematic side view in cross-section showing a preferred embodiment of the water leakage estimation method according to the present invention.

Referring to FIG. 2, a reference numeral 9 designates a floor surface; a numeral 10 refers to a containment vessel for a nuclear reactor; a numeral 11 denotes a pipe arrangement; a numeral 12 refers to connections, etc. of the pipe arrangement 11, where possibility of the water leakage is high; numerals 13 and 14 refer to first and second water collecting ports at the bottom-most floor surface in the containment vessel 10; a reference numeral 15 represents a total water collecting sump; and a numeral 16 refers to water collecting channels.

It should be noted here that only two water collecting ports 13 and 14 are shown in the drawing for the convenience of explanations, but such water collecting ports are greater in number than illustrated.

A numeral 17 refers to a water sensor provided at the first water collecting port 13, a referrence numeral 18 designates another water sensor provided at the second water collecting port 14, and a numeral 20 represents an assumed position for the sake of explanation, where the water leakage is assumed to have taken place.

In FIG. 2, the points 12 of high leakage possibility are present both above the first water collecting port 13 and above the second water collecting port 14. Assume now that the water leakage has taken place at a certain point 20. It can be thought that the leakage water from this position 20 gathers mostly in the first water collecting port 13, and gathers scarcely or not at all in the second water collecting port 14. The reason that the leaked water spreads around a certain area is that the leaking water does not drop right downward from the point 20, but collides with other objects on the way to possibly splash around the neighboring region.

From this, it may be estimated on the basis of the quantity of leakage water gathered at the first and second water collecting ports 13 and 14 the likely area in which area the water leakage has taken place.

This will be further explained by use of a mathematical equation. It is now assumed that a series of designations (for the sake of convenience in explanation, numerals 1, 2, ... N are used here) are given in advance to those parts of water distribution pipe, etc. where possibility of water leakage is present.

In this case, a percentage ratio of the leakage water to be distributed to each of the water collecting ports when water leakage has taken place from the position N can be estimated beforehand or determined experimentally from the positional relationship in the physical structure between the water collecting ports and the leakage points.

The following Table 1 indicates the probability in distribution of the leaked water to each of the water collecting ports when the number of the water collecting ports is three, and the possible point of water leakage is N.

TABLE 1

| No. of Possible Point of Water Leakage | Weight Coefficient at First Water Collecting Port | Weight Coefficient at Second Water Collecting Port | Weight Coefficient at Third Water Collecting Port |
|---|---|---|---|
| 1 | $\alpha_1$ | $\beta_1$ | $\gamma_1$ |
| 2 | $\alpha_2$ | $\beta_2$ | $\gamma_2$ |
| 3 | $\alpha_3$ | $\beta_3$ | $\gamma_3$ |
| 4 | $\alpha_4$ | $\beta_4$ | $\gamma_4$ |
| . | . | . | . |
| . | . | . | . |
| N | $\alpha_N$ | $\beta_N$ | $\gamma_N$ |

Here, $\alpha_K + \beta_K + \gamma_K = 1$ (K = 1, 2, ... N)

It is now assumed that a quantity of water leaked from each possible point of water leakage at a certain time instant is $X_K$ (K = 1, 2, ... N), and that the quantity of water collected at the first, second and third water collecting ports are respectively A, B and C, the following relationship is established.

$$\begin{bmatrix} A \\ B \\ C \end{bmatrix} = \begin{bmatrix} \alpha_1, \alpha_2, \ldots \alpha_N \\ \beta_1, \beta_2, \ldots \beta_N \\ \gamma_1, \gamma_2, \ldots \gamma_N \end{bmatrix} \begin{bmatrix} X_1 \\ X_2 \\ \vdots \\ X_N \end{bmatrix} \quad (1)$$

Conversely, therefore, the leakage quantity of water at the possible point of leakage, when the water collecting amounts of A, B and C are given, can be estimated from the following equation.

$$\begin{bmatrix} X_1 \\ X_2 \\ \vdots \\ X_N \end{bmatrix} = \begin{bmatrix} \alpha_1', \beta_1', \gamma_1' \\ \alpha_2', \beta_2', \gamma_2' \\ \vdots \\ \alpha_N', \beta_N', \gamma_N' \end{bmatrix} \begin{bmatrix} A \\ B \\ C \end{bmatrix} \quad (2)$$

Here, $$\begin{bmatrix} \alpha_1', \beta_1', \gamma_1' \\ \alpha_2', \beta_2', \gamma_2' \\ \vdots \\ \alpha_N', \beta_N', \gamma_N' \end{bmatrix} = \begin{bmatrix} \alpha_1, \alpha_2, \ldots \alpha_N \\ \beta_1, \beta_2, \ldots \beta_N \\ \gamma_1, \gamma_2, \ldots \gamma_N \end{bmatrix}^{-1} \quad (3)$$

Table 2 indicates procedures to find out estimated leakage quantity at a position where the leakage of water is likely to occur, on the basis of the detected water leakage quantity at each water collecting port. Here, $\alpha_1', \alpha_2', \ldots \alpha_N'; \beta_1', \beta_2', \ldots \beta_N';$ and $\gamma_1', \gamma_2', \ldots \gamma_N'$ are all derived from the above-described equation (3).

TABLE 2

| No. of Possible Point of Water Leakage | Probable Quantity of Leakage at First Water Collecting Port | Probable Quantity of Leakage at Second Water Collecting Port | Probable Quantity of Leakage at Third Water Collecting Port | Probable Quantity of Water Leakage at all Ports |
|---|---|---|---|---|
| 1 | $\alpha_1' \times A$ | $\beta_1' \times B$ | $\gamma_1' \times C$ | $\alpha_1' \cdot A + \beta_1' \cdot B + \gamma_1' \cdot C$ |
| 2 | $\alpha_2' \times A$ | $\beta_2' \times B$ | $\gamma_2' \times C$ | $\alpha_2' \cdot A + \beta_2' \cdot B + \gamma_2' \cdot C$ |
| 3 | . | . | . | . |
| 4 | . | . | . | . |
| . | . | . | . | . |
| N | $\alpha_N' \times A$ | $\beta_N' \times B$ | $\gamma_N' \times C$ | $\alpha_N' \cdot A + \beta_N' \cdot B + \gamma_N' \cdot C$ |

Figure 1:
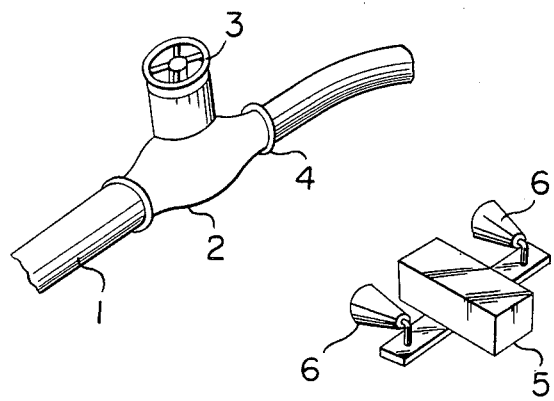
FIG. 1 is a schematic perspective view showing a construction of a conventional system for finding a position of water leakage.
Figure 3:
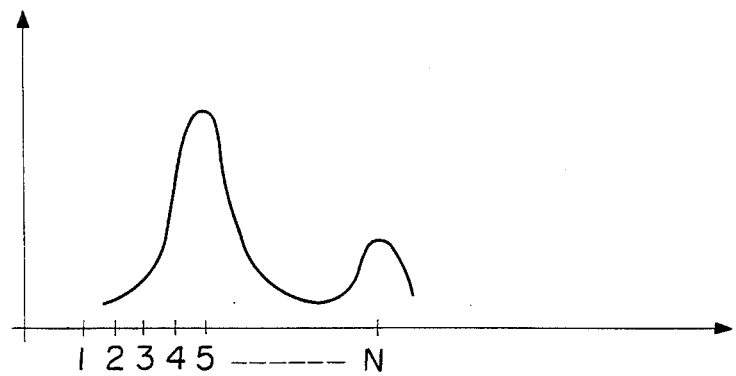
FIG. 3 is a graphical representation of the results shown in Table 2.

FIG. 3 is a graphical representation for easy understanding of the results in Table 2 above, in which the abscissa denotes the numerical designation of each possible point of water leakage, and the ordinate indicates the estimated quantity of water leakage. According to this example, the position where the water leakage has occurred is likely to be at two points, i.e., No. 5 and No. N.

In the above-described example, explanations have been given with the number of the water collecting port being three. It should, however, be noted that the more water collecting ports there are, the better becomes the resolution of the estimated position of the water leakage.

Incidentally, the water leakage sensor to be installed at the water collecting port may be of any type such as one which detects a flow rate of the leaked water, or one which detects quantity of water collected within a certain set period of time. Needless to say, more accurate estimation of the water leakage position can be effected with combined use of the conventional water leakage detection system such as, for example, combination of the system according to the present invention and a signal from various radiation monitors.

As described in the foregoing, the present invention is constructed in such a way that water leakage from water distribution pipe, etc. in the containment vessel for a nuclear reactor, etc., for example, is estimated by statistically processing signals from the water sensor provided at each of a plurality of water collecting ports which are separately installed area-wise on the floor surface within the containment vessel, on the basis of which the probability of occurrence of the water leakage is calculated for each point or position in the water distribution pipe, so that it is possible to estimate with substantial accuracy in which portion of the water distribution pipe, etc. the water leakage has occurred, hence the discovery of the water leaking position can be done quickly and easily.

Although, in the foregoing, the present invention has been described with reference to a particular embodiment, it will be understood by those skilled in the art that the invention is capable of a variety of alternative embodiments within the spirit and scope of the invention as set forth in the appended claims.

What is claimed is:

1. A method of estimating a water leakage position in a water conveying conduit within a containment vessel, comprising the steps of:

providing a bottom part of said containment vessel with at least two water collection ports, each of said ports having a leakage water sensor;

sensing a quantity of water collected at each of said ports;

predetermining a weight coefficient for each of said ports as a function of the position of said port with respect to the position of a leak; and estimating said water leakage position in a horizontal plane based upon said sensed collected water and said weight coefficient for each of said ports.

2. The method of estimating a water leakage position according to claim 1, wherein said weight coefficient comprises a distribution probability of leakage water to each of said leakage water collecting ports.

3. The method of estimating a water leakage position according to claim 2, wherein said estimating step is calculated with the following equation:

$$\begin{bmatrix} A \\ B \\ C \\ . \\ . \\ . \\ N \end{bmatrix} = \begin{bmatrix} \alpha_1, \alpha_2, \ldots \alpha_N \\ \beta_1, \beta_2, \ldots \beta_N \\ \gamma_1, \gamma_2, \ldots \gamma_N \\ . \quad . \quad \quad . \\ . \quad . \quad \quad . \\ . \quad . \quad \quad . \\ \nu_1, \nu_2, \ldots \nu_N \end{bmatrix} \begin{bmatrix} X_1 \\ X_2 \\ . \\ . \\ . \\ X_N \end{bmatrix} \quad (1)$$

where: A, B, C ... N denote a quantity of water collected at water collecting ports; $\alpha, \beta, \gamma, \ldots \nu$ represent said weight coefficients of the respective water collecting ports; and $X_1, X_2, \ldots X_N$ represent said water leakage quantities at the possible water leaking points.

* * * * *